US009363566B2

(12) United States Patent
Makhijani et al.

(10) Patent No.: US 9,363,566 B2
(45) Date of Patent: Jun. 7, 2016

(54) METHOD AND SYSTEM FOR PREPOSITIONING CONTENT AND DISTRIBUTING CONTENT IN A LOCAL DISTRIBUTION SYSTEM

(71) Applicant: The DIRECTV Group, Inc., El Segundo, CA (US)

(72) Inventors: Michael A. Makhijani, Playa Vista, CA (US); Vishal Arya, Manhattan Beach, CA (US); John L. Pang, Monterey Park, CA (US); Richard B. Tatem, Middletown, MD (US); Paul O. Viazcan, Whittier, CA (US); Ranny Q. Sue, Laguna Niguel, CA (US); Drew T. Chen, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/488,015

(22) Filed: Sep. 16, 2014

(65) Prior Publication Data

US 2016/0080821 A1    Mar. 17, 2016

(51) Int. Cl.
*H04N 21/472*    (2011.01)
*H04N 21/432*    (2011.01)
(Continued)

(52) U.S. Cl.
CPC ..... *H04N 21/47202* (2013.01); *H04N 7/17318* (2013.01); *H04N 7/17336* (2013.01);
(Continued)

(58) Field of Classification Search
CPC .................. H04N 21/8456; H04N 21/23439; H04N 21/64322; H04N 21/26258; H04N 21/262; H04N 21/63; H04N 21/845; H04N 21/47202; H04N 21/432; H04N 21/436; H04N 21/6143; H04N 21/6193; H04N 7/17318; H04N 7/17336; H04N 7/20
See application file for complete search history.

(56) References Cited

U.S. PATENT DOCUMENTS 5,701,152 A    12/1997    Chen
5,760,819 A    6/1998    Sklar et al.
(Continued)

FOREIGN PATENT DOCUMENTS

EP    1233592    8/2002
EP    1530339    5/2005
(Continued)

OTHER PUBLICATIONS

David, Leonard; "Stratospheric Platform Serves as Satellite"; Jul. 24, 2002; http://www.space.com/missionlaunches/skytower_020724.html.
(Continued)

*Primary Examiner* — Randy Flynn
(74) *Attorney, Agent, or Firm* — Harness, Dickey & Pierce, P.L.C.

(57) ABSTRACT

A system for viewing on-demand content includes a user receiving device and a local head end in communication with the receiving device that communicates metadata and material identifiers for on-demand content. Each on-demand content is associated with one of the material identifiers. The user receiving device stores the metadata and the material identifiers for the on-demand content. The local head end receives content. Each content is associated with one of the material identifiers. The user receiving device communicates a request for on-demand content data signal to the local head end. The local head end communicates a manifest comprising material identifiers for content stored at the head end. The user receiving device, after receiving the manifest, displays metadata from the memory of the user receiving device corresponding to the material identifiers.

19 Claims, 10 Drawing Sheets

(51) Int. Cl.
  *H04N 21/436* (2011.01)
  *H04N 21/61* (2011.01)
  *H04N 7/173* (2011.01)
  *H04N 7/20* (2006.01)

(52) U.S. Cl.
  CPC .............. *H04N 7/20* (2013.01); *H04N 21/432* (2013.01); *H04N 21/436* (2013.01); *H04N 21/6143* (2013.01); *H04N 21/6193* (2013.01)

(56) References Cited

U.S. PATENT DOCUMENTS

| | | |
|---|---|---|
| 5,801,751 A | 9/1998 | Sklar et al. |
| 5,973,722 A | 10/1999 | Wakai et al. |
| 5,990,928 A | 11/1999 | Sklar et al. |
| 6,064,724 A | 5/2000 | Kelly |
| 6,118,976 A | 9/2000 | Arias et al. |
| 6,201,797 B1 | 3/2001 | Leuca et al. |
| 6,208,307 B1 | 3/2001 | Frisco et al. |
| 6,259,891 B1 | 7/2001 | Allen |
| 6,442,385 B1 | 8/2002 | Marko |
| 6,529,706 B1 | 3/2003 | Mitchell |
| 6,622,307 B1 | 9/2003 | Ho |
| 6,802,077 B1 | 10/2004 | Schlarb |
| 7,103,317 B2 | 9/2006 | Chang et al. |
| 7,600,249 B1 | 10/2009 | Blevins |
| 7,610,602 B2 | 10/2009 | Ficco |
| 7,904,924 B1* | 3/2011 | de Heer .............. H04N 21/4532 705/347 |
| 7,925,216 B2 | 4/2011 | Casavant et al. |
| 8,132,216 B1 | 3/2012 | Tatem |
| 8,813,117 B1* | 8/2014 | Inskip, VI ............ H04N 21/835 709/231 |
| 2002/0026645 A1 | 2/2002 | Son et al. |
| 2003/0186647 A1 | 10/2003 | Ikeda |
| 2003/0208764 A1 | 11/2003 | Galipeau et al. |
| 2003/0216120 A1 | 11/2003 | Ceresoli et al. |
| 2004/0153767 A1 | 8/2004 | Dolgonos |
| 2004/0261110 A1 | 12/2004 | Kolbeck et al. |
| 2005/0009466 A1 | 1/2005 | Kamdar et al. |
| 2005/0028208 A1 | 2/2005 | Ellis et al. |
| 2005/0068915 A1 | 3/2005 | Atad et al. |
| 2005/0124289 A1 | 6/2005 | Coffin, III |
| 2005/0136975 A1 | 6/2005 | Caspi et al. |
| 2005/0216941 A1 | 9/2005 | Flanagan et al. |
| 2005/0282489 A1 | 12/2005 | Kamdar et al. |
| 2006/0004948 A1 | 1/2006 | Grace et al. |
| 2006/0075444 A1 | 4/2006 | Dillen |
| 2006/0107295 A1 | 5/2006 | Margis et al. |
| 2006/0128418 A1 | 6/2006 | Quelle et al. |
| 2006/0154687 A1 | 7/2006 | McDowell et al. |
| 2006/0166739 A1 | 7/2006 | Lin |
| 2006/0194535 A1 | 8/2006 | Houldsworth et al. |
| 2006/0240811 A1 | 10/2006 | De Luca |
| 2006/0285508 A1 | 12/2006 | Vermola et al. |
| 2006/0294205 A1 | 12/2006 | Aaltonen et al. |
| 2007/0086364 A1 | 4/2007 | Ellis et al. |
| 2007/0155307 A1 | 7/2007 | Ng et al. |
| 2008/0155613 A1 | 6/2008 | Benya et al. |
| 2008/0184300 A1 | 7/2008 | Macrae et al. |
| 2008/0199150 A1* | 8/2008 | Candelore ........ H04N 21/23892 386/241 |
| 2009/0064262 A1 | 3/2009 | Lejeune |
| 2009/0228908 A1 | 9/2009 | Margis et al. |
| 2009/0300729 A1 | 12/2009 | Karaoguz et al. |
| 2009/0320058 A1 | 12/2009 | Wehmeyer et al. |
| 2010/0235528 A1* | 9/2010 | Bocharov ........... H04N 21/6437 709/231 |
| 2011/0173345 A1* | 7/2011 | Knox .................. H04L 67/2833 709/246 |
| 2011/0219063 A1* | 9/2011 | Park .................... H04N 21/2387 709/203 |
| 2012/0254365 A1* | 10/2012 | Adimatyam ....... H04N 21/8456 709/219 |
| 2013/0054728 A1 | 2/2013 | Amir et al. |
| 2013/0091521 A1* | 4/2013 | Phillips ............ H04N 21/23424 725/35 |
| 2014/0033236 A1 | 1/2014 | Guzman et al. |
| 2014/0129618 A1 | 5/2014 | Panje et al. |
| 2014/0282765 A1* | 9/2014 | Casey ................ H04N 21/2225 725/93 |

FOREIGN PATENT DOCUMENTS

| | | |
|---|---|---|
| GB | 2387090 | 10/2003 |
| GB | 2407738 | 5/2005 |
| WO | 0143364 | 6/2001 |
| WO | 2004054226 | 6/2004 |
| WO | 2011106601 | 9/2011 |

OTHER PUBLICATIONS

Daimlerchrysler; "DaimlerChrysler IT Cruiser Telematics Concept"; Internet citation; retrieved from the internet: URL:http://java.sun.com/products/consumer-embedded/automotive/whitepapers/ITCruiser-Whitepaper.pdf; Jan. 2001; pp. 1-11; XP002271676.
International Search Report and Written Opinion dated Nov. 16, 2015 in International Application No. PCT/US2015/050043 filed Sep. 14, 2015 by Michael A. Makhijani et al.
Wikipedia; "Home Theater Personal Computer"; Internet Article; Aug. 29, 2014; Retrieved from the Internet: URL:https://de.wikipedia.org/w/index.php?title=Home_Theater_Personal_Computer&oldid=133532331 [retrieved on Nov. 3, 2015]; whole document.
Wikipedia; "Digital media player"; Internet Article; Sep. 11, 2014; XP055225260; Retrieved from the Internet: URL:https://en.wikipedia.org/w/index.php?title=Digital_media_player&oldid=625034161 [retrieved on Nov. 3, 2015]; whole document.
Wikipedia; "iTunes"; Internet Article; Aug. 19, 2014; XP055225746; Retrieved from the Internet: URL:https://en.wikipedia.org/w/index.php?title=ITunes&oldid=621917825 [retrieved on Nov. 4, 2015]; see in particular sections "Library sharing", "Library viewing" and "iTunes Store".
Wikipedia; "Smart TV"; Internet Article; Jul. 6, 2014; XP055225742; Retrieved from the Internet: URL:https://en.wikipedia.org/w/index.php?title=Smart_TV&oldid=615795558 [retrieved on Nov. 4, 2015]; whole document.
Wikipedia; "Media server"; Internet Article; Jun. 23, 2014; XP055225261; Retrieved from the Internet: URL:https://en.wikipedia.org/w/index.php?title=Media_server&oldid=614062595 [retrieved on Nov. 3, 2015]; whole document.
Carbou, Romain; Diaz, Michel; Exposito, Ernesto; Roman, Rodrigo; "Digital Home Networking"; Oct. 31, 2011; John Wiley & Sons; XP055225295; ISBN: 978-1-84821-321-0; section "4.2. Standards Used in the Home".
Remy, Jean-Gabriel; Letamendia, Charlotte; "Home Area Networks and Iptv"; May 31, 2011; John Wiley & Sons; XP055225308; ISBN: 978-1-84821-295-4; section "5.2. The Digital Leisure Network: UPNP/DLNA".
Bott, Ed; Siechert, Carl; Stinson, Craig; "Windows® 7 Inside Out, Deluxe Edition"; Jul. 15, 2011; Microsoft Press; XP055225325; ISBN: 978-0-7356-5692-5; Chapter "14. Sharing and Syncing Digital Media".

* cited by examiner

METHOD AND SYSTEM FOR PREPOSITIONING CONTENT AND DISTRIBUTING CONTENT IN A LOCAL DISTRIBUTION SYSTEM

TECHNICAL FIELD

The present disclosure relates generally to television systems and, more particularly, a system for providing on-demand content through a hospitality system.

BACKGROUND

Satellite television has become increasingly popular due to the wide variety of programming available and the quality of service. Hospitality systems may offer various types of programming from cable systems or satellite systems to guests. Often times, the systems are provided without program guides or other amenities typically found in a home viewing experience.

Hotel owners and property managers are continually trying to provide a wide variety of services to guests to enhance their stay at the location. Pay-per-view and on-demand are typically provided in home-viewing cable and satellite systems. However, hotels using satellite systems do not offer such services.

On-demand services use the Internet to provide content to the users. The speed and quality of an Internet connection to a hotel varies. The load on the connection can also vary substantially during the day. For an on-demand system relying on the internet connection exclusively to provide content to multiple rooms during a peak usage time period rooms would overload the Internet connection.

SUMMARY OF THE DISCLOSURE

The present disclosure provides a system and method for providing on-demand content through a hospitality system that reduces difficulties due to varying the hotel Internet connection.

In one aspect of the disclosure, a method includes communicating metadata and material identifiers for on-demand content to a user receiving device, each on-demand content is associated with one of the material identifiers. The method further includes storing the metadata and the material identifiers for the on-demand content in the user receiving device, receiving content at a local head end, each content associated with one of the material identifiers, communicating a request for on-demand content data signal from the user receiving device to the local head end, communicating a manifest comprising material identifiers for content stored at the head end to the user receiving device and, after communicating the manifest to the user receiving device, and displaying metadata from the memory of the user receiving device corresponding to the material identifiers stored at the user receiving device.

In a further aspect of the disclosure, a system that includes a user receiving device and a local head end in communication with the receiving device that communicates metadata and material identifiers for on-demand content. Each on-demand content is associated with one of the material identifiers. The user receiving device stores the metadata and the material identifiers for the on-demand content. The local head end receives content. Each content is associated with one of the material identifiers. The user receiving device communicates a request for on-demand content data signal to the local head end. The local head end communicates a manifest comprising material identifiers for content stored at the head end. The user receiving device, after receiving the manifest, displays metadata from the memory of the user receiving device corresponding to the material identifiers.

Other features of the present disclosure will become apparent when viewed in light of the detailed description when taken in conjunction with the attached drawings and appended claims.

DETAILED DESCRIPTION

Figure 1A:
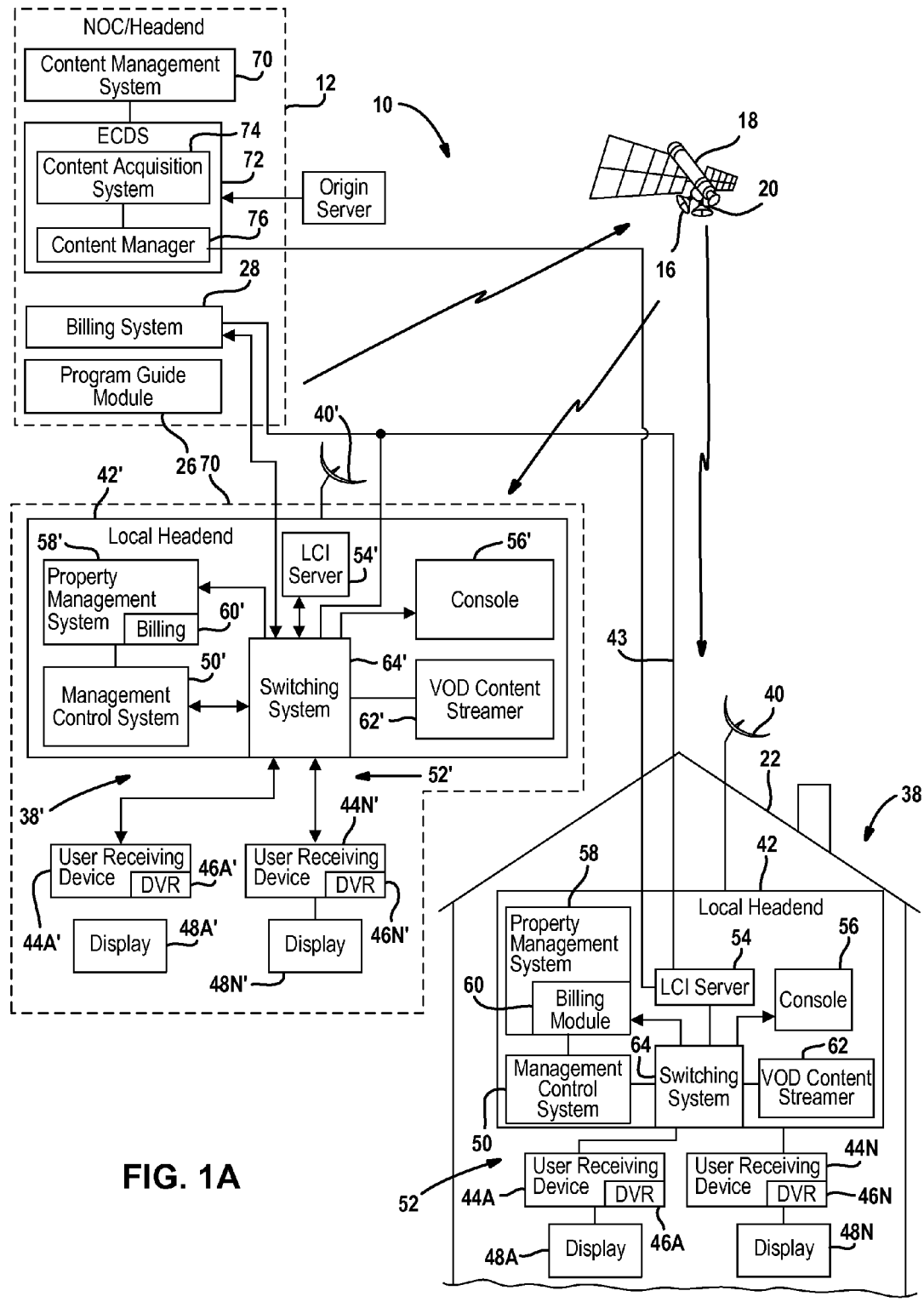
FIG. 1A is a block diagrammatic view of a content distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user receiving device. Both the data source and the user receiving device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

In the present example, metadata for content is provided through a first network and the actual content such as an on-demand movie or program is communicated through a second network. In the present example, the first network is the satellite network. The second network is the Internet.

Referring now to FIG. 1A, a satellite television broadcasting system 10 is illustrated. The satellite television broadcasting system 10 includes an operational head end or network operations center (NOC) 12 that generates wireless uplink signals through a transmitting antenna 14 which are received by a receiving antenna 16 of a satellite 18. The head end 12 may be referred to as a remote head end since it is separated from a local head end. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a larger home, a multiple dwelling units, hotel or other types of commercial buildings in which having multiple screen displays coupled to a local server are desirable.

The wireless signals may have various types of data associated with them including various channel information such as a channel or program guide data, metadata, location information and the like. A television channel communicated from outside the building 22 or property will be referred to as an external channel. The guide data corresponding to the external channel is referred to as external guide data. Both the external guide data and external channel data may be received from the network operations center 12 or external head end 12. The wireless signals may also have various video and audio signals associated therewith.

The wireless signals may also include program guide data from a program guide module 26. The program guide module 26 may communicate various objects to the end users through the head end 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like. The program guide data may also include data corresponding to pay-per-view events. Pay-per-view (PPV) events are events that are broadcasted in a linear manner and may be tuned to for a fee. Pay-per-view events are broadcasted to each user simultaneously at a preset start time and end time. When a user purchases the pay-per-view session, encryption data is provided to a receiving device to decode the encrypted signal. The pay-per-view content is broadcasted on a single channel to a plurality of receiving devices at a predetermined start time.

The program guide data may also include video-on-demand (VOD) metadata. Video-on-demand content is program content that is provided to a user receiving device when requested. That is, on-demand content is not linear content in that the start time and end time are pre-established or scheduled. The start time and end time are based upon the request time and thus various users may request the same content starting and ending at different times. On-demand content may be for a fee or free. Both on-demand and pay-per-view content may be provided free for the first few minutes as a preview. On-demand program guide data may be associated with a unique material identifier for each content title. The unique content identifier has other associated metadata such as but not limited to the actors, posters for the content, ratings, descriptions and the like.

A billing system 28 may also be associated with the network operation center or head end 12. The billing system 28 may provide billing for various operations within the building 22. In this example, the billing system 28 may provide a bill to the operators of the building 22 for various activity within the building including pay-per-view viewing and video-on-demand viewing as well as other periodic service charges.

Although illustrated within the head end, the program guide module and the billing system 28 may be separate systems located remotely from the head end 12.

Building 22 includes an aggregated content distribution system 38 for distributing both local content and external content. The local content may include both local channels for providing guest information as well as local channels used for on-demand content. The aggregated content distribution system 38 includes a receiving antenna 40 that receives the wireless signals from the satellite 18 and processes the signals in a local head end 42. The local head end 42 is within the property or building 22. The local head end 42 is physically separated from the external head end 12 by some transmission medium such as the satellite, cable or another wired, wireless network or combination thereof. In this example, a satellite and terrestrial network 43 are used. The terrestrial network 43 may be a phone, cable, wired or wireless network. Although only one antenna 40 is illustrated more antennas may be provided.

The local head end 42 provides communication signals to a plurality of user receiving devices 44A-44N. The plurality of user receiving devices 44A-44N may be referred to as a set top box or integrated receiver decoder. In a hotel environment, the user receiving device 44 may be desired to be hidden from view. In such a situation, the set top box may be hidden behind the television and out of sight of the customers. A hidden user receiving device may be referred to as a setback box. The set top box or setback box circuitry may be incorporated into the display circuitry. The setback box and set top box may be functionally equivalent. Unless otherwise stated, the term user receiving device is interchangeable with a set top box unless otherwise stated.

Each user receiving device 44A-44N may include an optional digital video recorder (DVR) 46A-46N. The digital video recorders 46A-46N may include a user partition and a network partition. This is illustrated below. The user partition is memory space that is set aside for the use of recording programming thereon. The network partition may include various controls, guide data and other data that may be provided to the set top box that is not under the control of the user or customer. As will be described below, the user partition may be reset or erased when a customer checks out from the building when the building is a hotel. Parental controls may also be erased or reset. Parental controls allow content above a rating to be restricted or not viewed at the user receiving device.

The plurality of user receiving devices 44A-44N receives signals from the local head end 42 and controls a respective display device 48A-48N in response to thereto. The display devices 48A-48N may include either an audio or a video display, or both. The display devices 48A-48N may be monitors or television displays. The display devices 48A-48N are individually controlled by their respective user receiving devices 44A-44N.

As was mentioned above, the system 38 may also apply to a cable-based or terrestrial wireless system. In such a case, the antenna 40 would be replaced with a cable connection or terrestrial antenna. The system 38 may also be used in a terrestrial broadcast system. In such a case, the satellite antenna 40 would be replaced by a terrestrial signal receiving antenna.

The local head end 42 includes a management control system 50 that performs many functions. The management control system 50 maintains a database with data about the user-receiving devices 44A-44N in a local network 52 that is in communication with the local head end 42. The management control system 50 also provides a server-based web application to manage the user receiving devices within the local network 52.

The management control system 50 also performs other functions including maintaining a channel list for the local content insertion channels, pay-per-view channels and VOD content titles. The channel or program metadata such as title, description, actors, review, etc. may also be included in the channel list. As mentioned above, the local head end may provide on-demand content for content stored within the local head end for which special channels are allocated for delivery. The details of the management control system will be set forth further in FIG. 3.

The local head end 42 may also include a local content insertion (LCI) server 54 that provides and manages the local content files, the generation of channel information, the sending of channel information to the user receiving devices 44A-44N and multicasting the local content via the network 52.

A console 56 may also be included within the local head end 42. The console 56 may be a web-based computer that accesses the various server applications provided within the local head end 42. A system operator may control the various functions of the local head end 42 including but not limited to system settings, channel adjustments and allocations for local channel PPV channels and VOD channels.

A property management system 58 may also be included within the local head end 42. The property management system 58 manages various functions including check-ins and check-outs. Also, accounting, bookkeeping, occupancy reports and the like may also be provided from the property management system 58. The property management system 58 may interface with various systems to perform functions such as pay-per-view and video on-demand record retrieval, hotel head end status, room use and the like. The property management system 58 and the management control system 50 may be in direct communication.

The property management system 58 may also include a billing module 60. The billing module 60 may keep track of various purchase records and expenses associated with each property area, room or user. The billing system, for example, keeps track of the room charges, taxes, resort fees, pay-per-view and on-demand expenses. The billing module 60 may be a standalone module or incorporated within the property management system 58 as illustrated in the present example. The billing module 60 also determines whether a check-out has occurred. The billing module 60 may indicate a check-out using a check-out signal that is communicated within the property management system 58 and externally as will be described below. The billing module 60 may be in communication with the billing system 28.

The local head end 42 may also include a video-on-demand streamer module 62. The video-on-demand content streamer module 62 may provide a source for video-on-demand content. The video-on-demand content streamer module 62 may receive and store video-on-demand files within the local head end 42 as will be further described below. The video-on-demand content streamer module 62 may also be responsible for establishing and allocating bandwidth for video-on-demand within the local head end.

Each of the components 50-62 may also be in communication with a switching system 64. The switching system 64 may act as a routing system between the various components of the local head end, between the various components of the local head end 42 and the user receiving devices 44A-44N. The switching system 64 is illustrated as within the head end 42. However, the switching system 64 may be at least partially outside the local head end 42. The various functions of the components within the local head end 42 will be described in detail below.

An aggregated content distribution system 38' may also be disposed within a vehicle 70. The system 38' may also include an antenna 40', local head end 42' and a plurality of user receiving devices 44A'-44N' coupled to the local head end 42' through a network 52'. The vehicle 70 may be different types of vehicles including an airplane, ship, train, bus, van or automobile. Each of the user receiving devices 44A'-44N' may be coupled to a respective display device 48A'-48N'. As described above, each of the user receiving devices 44A'-44N' may also include a digital video recorder 46A'-46N', respectively. Also, the components of the local head end (50'-60') may also be similarly disposed for controlling and providing content to the various user receiving devices 44A'-44N'.

The head end 12 may also be associated with a content management system (CMS) 70. The content management system 70 may be used to generate a list of upcoming available titles. The list of available titles may be referred to as the playlist. The content management system 70 may also compile the metadata associated with each of the pieces of content. Each content may also have a material identifier for identifying the content. The content management system 70 may be located separate from or within the head end 12.

The content management system 70 is in communication with an enterprise content distribution system (ECDS) 72. The enterprise content distribution system 72 includes a content acquisition system 74 and a content manager 76. The content manager 76 receives the playlist from the content management system 70. The playlist is sent to the content acquisition system 74 which is used to retrieve the content from an origin server 80 at a content provider and communicate the content to the video-on-demand content streamer 62. The content distribution system 72 may communicate with the video-on-demand content streamer 62 directly or through the switching system 64.

The program guide module 26 may also be in communication with the content management system 70. The program guide module 26 communicates program guide data as well as video-on-demand metadata through the satellite 18 to local head end 42. Various types of data including content title, posters, actor data, and the like may all be communicated as metadata to the video-on-demand content streamer 62.

Figure 1B:
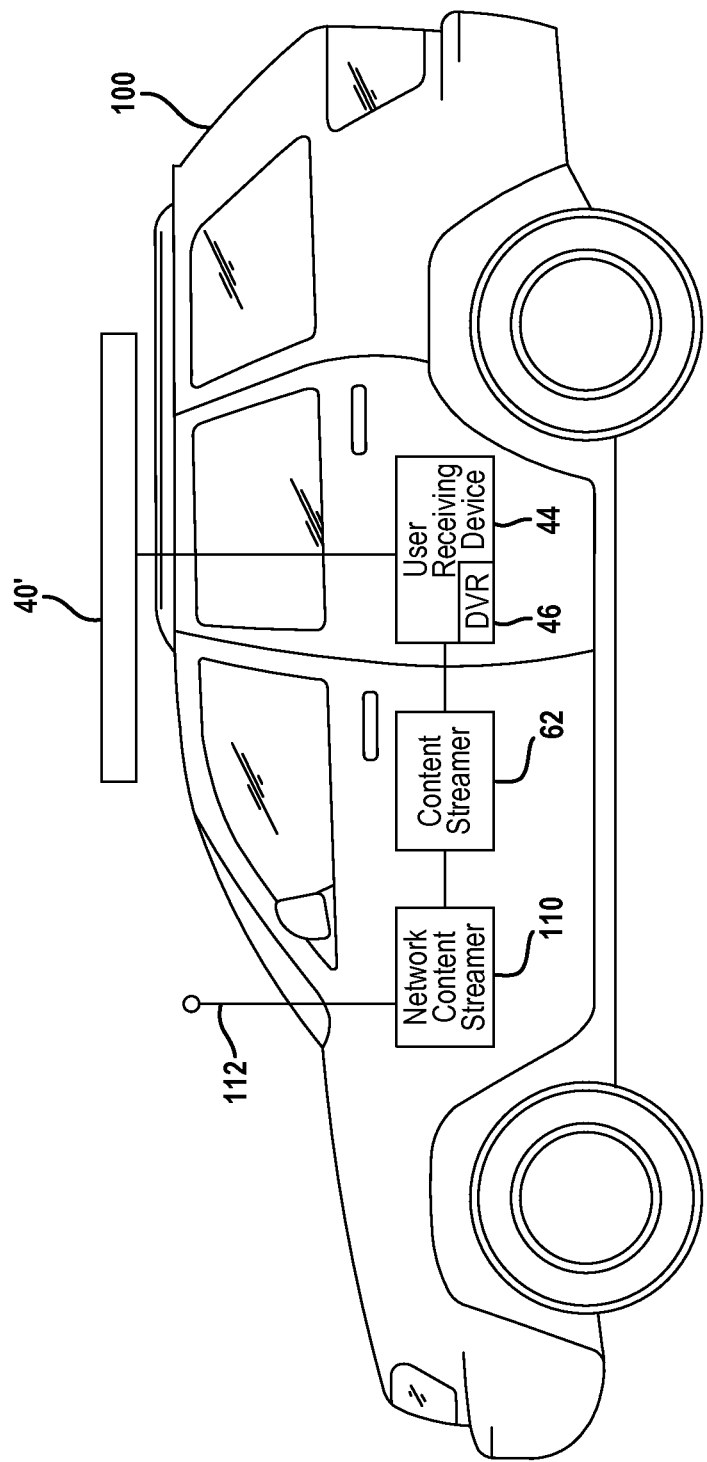
FIG. 1B is a block diagrammatic view of an alternative content distribution system.

Referring now to FIG. 1B, a simplified version of an automotive vehicle 100 is set forth. The automotive vehicle 100 may also have a user receiving device 44 and a digital video recorder or memory. The content streamer 62 may also be provided that is functionally similar to the content streamer set forth above. In this example, a network interface 110 is used to interface with a wireless network through an antenna 112. The network interface 100 may be capable of communicating through a wireless local area network or through a cellular network. The network interface may monitor the speed of the network and request content at a speed suitable for the network.

The user receiving device 44 of the vehicle 100 may be in communication with an antenna 40'. In this example, a flat panel antenna may be used.

Figure 2A:
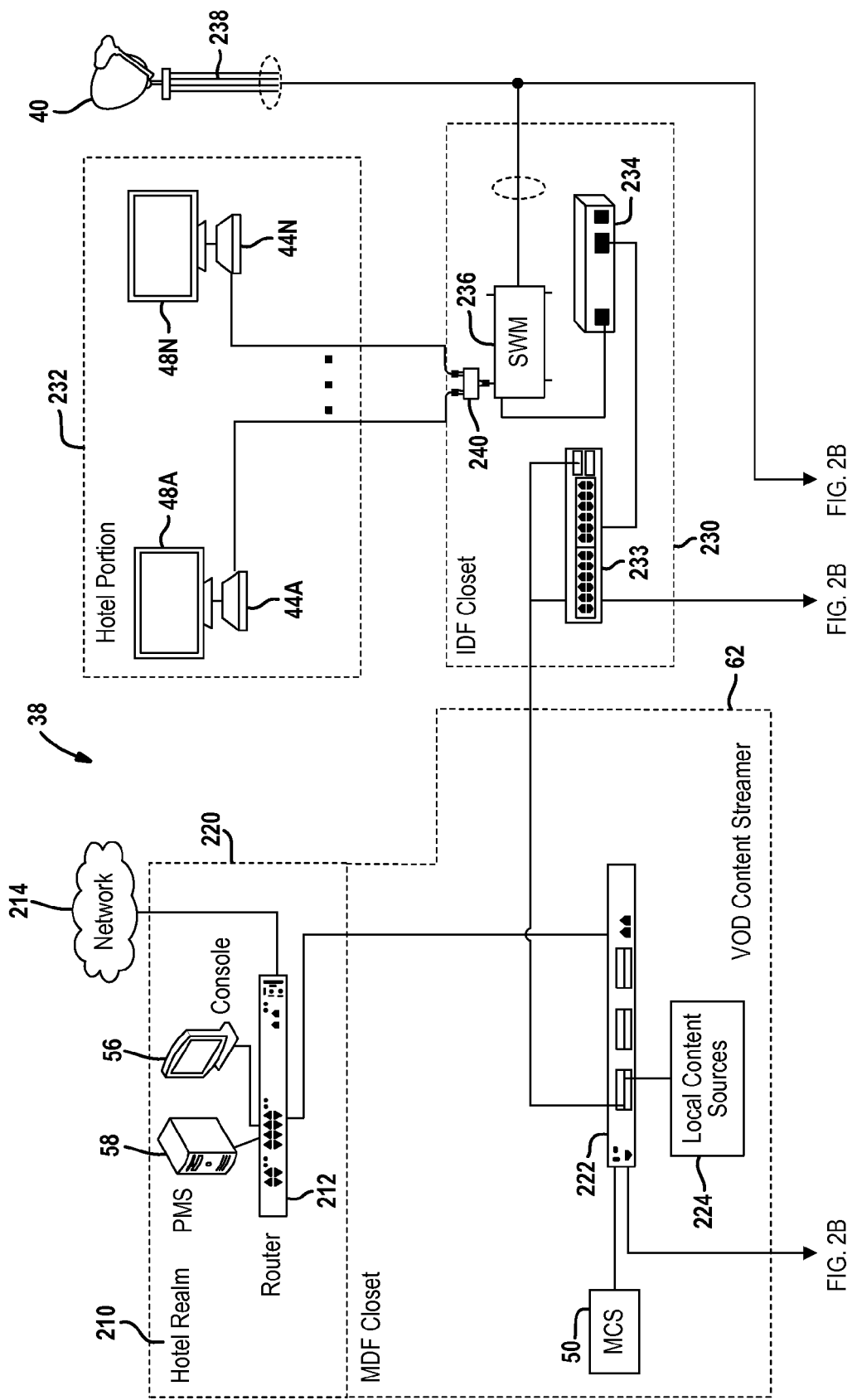
FIGS. 2A and 2B are a simplified block diagrammatic view of a local content distribution system.
Figure 2B:
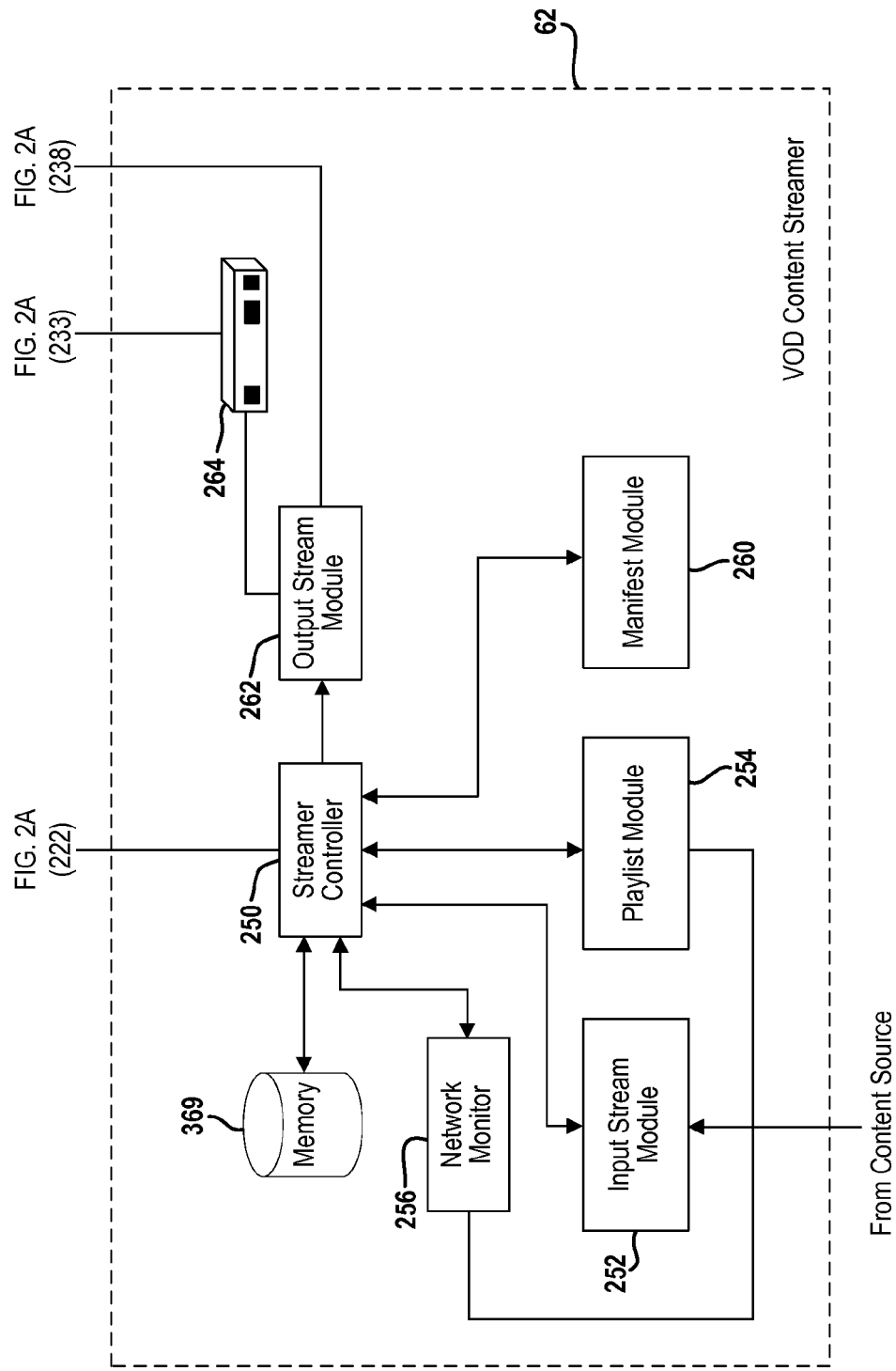

Referring now to FIGS. 2A and 2B, one example of the aggregated content distribution system 38 (or 38') is set forth for distributing local content, local pay-per-view and local video-on-demand content. Local video-on-demand content means content that is distributed to the user receiving device from the local head end. The local aggregated content distribution system 38 also distributes external content received from the external head end 12. The local content distribution system 38 is illustrated segmented into different functional areas. In this example, a property (or hotel in this example) control portion 210 includes a router 212, the console 56 and a property management system 58. The router 212 may be part of the switching system 64 illustrated in FIG. 1. The router 212 may also be in communication with a network 214 for receiving and transmitting various data.

A main distribution facility (MDF) 220 may also be part of the aggregated content distribution system 38. The main distribution facility 220 may be in communication with and physically separated from the hotel control portion 210. The main distribution facility 220 may be located in a closet or room, for example, in a basement or in an out-of-the-way location. The main distribution facility 220 may include a main distribution facility switch 222. The main distribution facility switch 222 may also be in communication with local content sources 224. The local content sources 224 will be described below as different means for providing local content signals to the remaining portions of the system. The management control system 50 may also be in communication with switch 222.

The aggregated content distribution facility 38 may also include an intermediate distribution facility (IDF) 230. The intermediate distribution facility 230 communicates the content to various user receiving devices such as user receiving devices 44A-44N located within hotel rooms 232. The intermediate distribution facility 230 may be located on each floor of the hotel or adjacent to the plurality of hotel rooms in which it serves. For larger systems 38, one main distribution facility 220 and a plurality of intermediate distribution facilities 230 may be used. The intermediate distribution facility 230 may include an intermediate distribution facility switch 233 which communicates signals to a format conversion module 234. The format conversion module 234 is used to convert internet protocol (IP) signals to a coaxial format. In this example, the conversion module 234 may be a DIRECTV® Ethernet coaxial adapter (DECA). The conversion module 234 is an IP-to-coaxial converter. The conversion module 234 is in communication with a single wire multi-switch or switch module (SWM) which is referred to as a switch module 236. The switch module 236 may also be in communication with the antenna 40. In this example, four outputs 238 are received from the antenna and communicated to the switch module 236. A splitter 240 may be used to split the output of the switch module 236 to communicate the content signals and guide data signals to the various areas such as hotel rooms 232 in this example.

The VOD content streamer 62 is in communication with the intermediate distribution facility switch 233. In another example, the VOD content streamer 62 may be in communication with the main distribution facility switch 222. By way of example, the management control system 50 may communicate a request for a list of currently replicated content at the VOD content streamer 62. Currently replicated content is content that is stored at the head end that is ready to be streamed to user receiving devices.

The VOD content streamer 62 may include a streamer controller 250. The streamer controller 250 may be in communication with an input stream module 252 that is in communication with the head end and/or the origin server 80 illustrated in FIG. 1. The input stream module 252 may also receive a playlist from the content distribution system 72. A playlist module 254 may also directly receive the playlist through the network. The playlist is received by the playlist module 254 may be communicated from the head end 12 to inform the content streamer 62 of content that is available through video-on-demand service. The playlist module 254 has a plurality of material identifications, one for each of the program titles that will ultimately be downloaded to the streamer 62. The input stream module 252 may request one or more items from the playlist module from the head end or origin server or other content source.

A network monitor 256 is used to monitor the connection to the content source. The network monitor 256 may, through the streamer controller 250, control the input stream module to request one or more titles simultaneously. The input stream module 252 may also be adjusted in terms of speed. Hotels or other buildings may have a limited amount of internet bandwidth. At busy times, the network may be monitored by the network monitor 256 and a reduction of bandwidth into the VOD content streamer 62 may be reduced.

Content received at the input stream module 252 may be stored within a memory 258 of the VOD streamer module 62. The memory 258 may be a part of a server or large memory bank. The memory 258 stores a plurality of content titles that are stored with a material identifier.

The streamer controller 250 also includes a manifest module 260. The manifest module 260 generates a manifest of material identifiers for content that has been fully saved or is ready to be streamed to user receiving devices within the building from the memory 258. Ultimately, the manifest module 260 generates a manifest that may be ultimately communicated to the user receiving devices to enable the user receiving devices to display the desired content choices as will be further described below. It is not until the content is ready to be streamed locally, that the titles and other metadata are displayed for user selection.

The VOD content streamer 62 may also include an output stream module 262. The output stream module 262 may stream content to the individual user receiving devices. The output stream module 262 may be in communication with the user receiving devices through a conversion module 264.

The conversion module 264 may be a DIRECTV® Ethernet coaxial adapter (DECA). The conversion module may be an IP-to-coaxial converter that allows the content to be communicated through the network of the building. The conversion module 264 may be unnecessary if the content is formatted in a format suitable for communication to the user receiving devices through the network.

Figure 3:
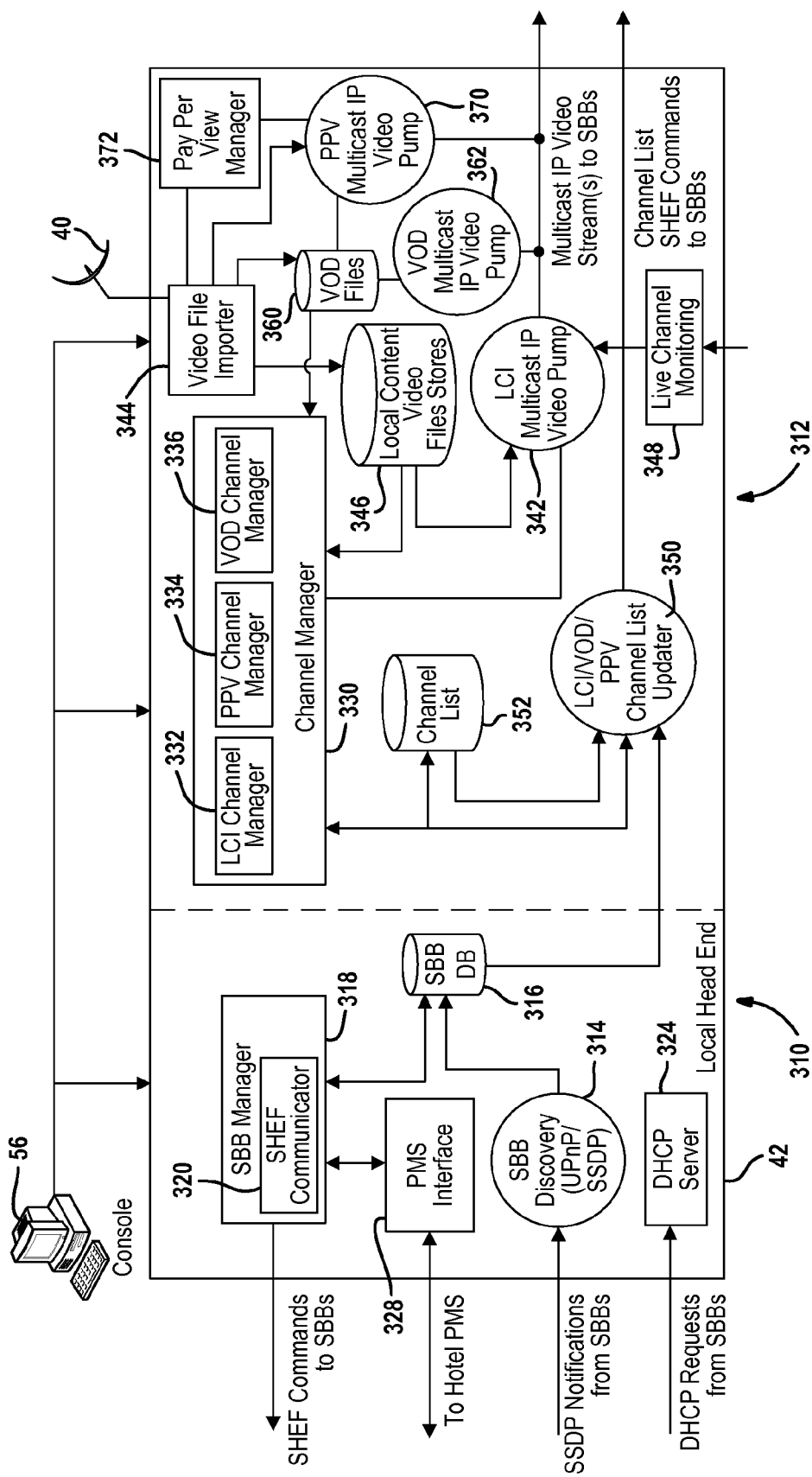
FIG. 3 is a block diagrammatic representation of the flow of content in the local head end.

Referring now to FIG. 3, the local head end 42 is illustrated in functional blocks that may be implemented in hardware, software or a combination of both. The local head end 42 has two main functions including user receiving device functions 310 and local content functions 312 such as local content insertion, pay-per-view insertions and video-on-demand insertion. The user receiving device functions 310 will be described as setback box functions but apply equally to various types of user receiving devices including a set top box.

The user receiving device functions 310 include a setback box discovery service 314. The setback box discovery service 314 initiates a service that listens to the local network to discover all the setback boxes on the network. The service may be implemented using different protocols including universal plug-and-play (UPnP) and simple service discovery protocol (SSDP). Upon discovery of a new setback box, the discovery service 314 reads identification data such as the IP address, the receiver identifier and the conditional access module information. Also, other types of data may be sent by the setback box discovery device including the signal quality, the current setback box time, and low battery status for the remote control. This data is stored within the setback box database 316. Each setback box may periodically notify the network of its presence. An "alive" status may also be communicated regularly by the setback boxes throughout the network. The setback box discovery service 314 receives the data which may be used by the setback box manager 318 to display availability information to the system operator. The receiver identifier may also be used for billing purposes.

The setback box database 316 contains lists for all discovered user receiving devices (setback boxes), a running status of the user receiving devices, a favorites list for each user receiving device and group data for the system.

The setback box manager 318 may include a set top box (STB) hypertext transfer protocol (HTTP) exported functionality (SHEF) communicator 320. The HTTP commands from the SHEF communicator 320 and as control commands to command the various user receiving devices to perform different functions. The SHEF communicator 320 is a service that the setback box manager 318 uses to generate appropriate SHEF commands. The SHEF communicator 320 is capable of simultaneously communicating with a group or sub-group of setback boxes in order to quickly and efficiently send and receive data from a large number of setback boxes. The groups or sub-groups may be selected at the console 56 of the local head end.

The SHEF communicator 320 may use a SHEF encryption key to communicate with each setback box in the system. It should be noted that although one SHEF communicator 320 is illustrated, different numbers of physical machines may be used to run the function of the SHEF communicator 320. The number of physical machines is dependent upon the number of user receiving devices. The SHEF communicator 320 initiates connections and prevents a second command from being sent to a setback box before a first command completes.

The setback box manager 318 allows the property management user to configure, manage and view the status of the various setback boxes within the system 38. This is performed using the console 56 illustrated in FIG. 3. All of the setback boxes for the system may be displayed at the console 56 with various data including a name, an IP address, a receiver ID, a status, whether or not the system is active, and the like. The display may also be organized by floors or other designated groups. Thus, different groups of setback boxes may be controlled in a different manner. The setback boxes may have access to different content or local channels as will be further described below. The setback box manager 318 may be used to set room numbers, reboot the setback boxes, display on-screen displays for a particular setback box or a group of setback boxes, and define, apply and reset default settings. The setback box manager 318 may also be used to define, manage and set favorites lists, receive visual or audio alerts regarding setback box changes from active to non-active, configure various screen alerts and the like.

The setback box manager 318 may also provide other functions including grouping of setback boxes into groups. This may be performed based upon room number. Groups may be assigned by selection for special groups or sub-groups at the facility. For example, when a conference is at a hotel, setback boxes for the rooms assigned to the attendees of the conference may be selected together. By selecting the group, local content channels may be accessed by only the attendees of the conference. For example, various lectures may be telecast through the local property. Another use is a concierge floor of a hotel which may allow access to more channels than a general guest. The groupings may also be assigned by floor.

The user receiving device functions 310 may also include a dynamic host configuration protocol (DHCP) server 324. The DHCP server 324 may be used to provide IP addresses to the setback boxes and used to receive requests from setback boxes using the dynamic host configuration protocol.

A property management system (PMS) interface 328 may also be included within a user receiving device functions 310. The PMS interface 328 allows the setback box manager 318 to communicate with the property management system 58 illustrated in FIG. 1. The property management system 58 may send event signals such as check-in or check-out signals. One purpose of the PMS interface 328 is to interface with an existing Property Management System with the local head-end. The PMS 85 may initiate resetting the defaults of the setback boxes in the rooms when a guest checks in or out by interfacing with the local head-end and sending these commands. A check-out or check-in signal may be received from the property management system which may then be communicated to the management control system 50. The PMS interface 328 is in communication with the setback box manager 318 which generates the appropriate communication signal such as the SHEF commands which are communicated to the setback boxes.

The head end may communicate with multiple PMSs from different hotel chains. Each PMS for each different hotel chains may each speak a different 'language/dialect' and the MCS provides an common interface which translates the head end commands to the PMS protocol/language for the individual chain.

The local content functions 312 are used for generating program guide channel objects for the local content channels, pay-per-view channels and video-on-demand inserted at the local head end. The channel objects provide the setback boxes with enough data to create an entry in the program guide in the setback box. The channel objects also provide enough data to allow the setback boxes to tune to the proper local channel. It should be noted that a standard program guide may be received in various manners from the satellite. The channel objects for the local channels may be referred to as a local channel insertion channel object. The program guide is thus modified from a standard program guide for the local content distribution system.

VOD guide objects provide data for the VOD content that is to be made available at the local system. For example, VOD guide objects may include a title, posters, descriptions, actors, ratings, studio and the like. As mentioned below, the displaying of the VOD metadata will not be performed until triggered by the receiving of the manifest.

The local content functions 312 include a channel manager 330. The channel manager 330 is used to define the channels that are communicated via a server-based web application. The channels may be managed by a web user interface from the console 56. Local content is distributed via a multicast stream having a multicast address on an IP network. Each multicast stream is defined by a channel which will appear in the setback box guide. Tuning data for the multicast stream is included in the program guide to allow the user receiving devices to tune to the channel. Virtual tuning may be used to "join" a multicast using a multicast IP address. Metadata may also be provided for the local content and the live channel streams. The channel manager may store metadata for local channels.

The channel manager 330 may be used for performing various functions. A local channel insertion channel manager 332 may be used to insert a channel that is generated locally at the property. This channel may include locally-generated videos, camera feeds, and the like. The channel manager 330 may also include a pay-per-view channel manager 334. The pay-per-view channel manager 334 is used to generate pay-per-view channels within the local content distribution system for distributing pay-per-view content. A video-on-demand channel manager 336 is used to generate video-on-demand channels at the local content distribution system.

The local content functions 312 are used to manage the list of all available channels of local content using the channel manager 330. The local content functions 312 may also provide the ability to stream out any local content insertion stored video files via a multicast IP stream using a local multicast IP video pump 342.

A video file importer 344 may be used to import files PPV via a file transfer protocol or USB. The video file importer 344 stores files in a video files store 346. The video file importer 344 imports content that is stored or prerecorded. The local content insertion functions 312 may also import content from live channels. A live channel monitoring system 348 may be provided prior to the multicast IP video pump 342. Live channels may be communicated to the multicast IP video pump 342 from the live channel monitoring system 348. The live channel monitoring system 348 may allow a check to be performed on the live channel so that "bad" content may not be distributed to the setback boxes. Live channel monitoring may include monitoring bitstreams for the live channels for validation. Checks may be a simple MPEG-2 transport packet synch-byte verification or looking for the presence of a particular bitstream. Of course, other types of monitoring, depending on the type of signal, may be performed.

A channel list updater 350 may be used to update a channel list 352 in response to the channel manager 330. The channel manager 330 may initiate an additional channel (channel insertion) or remove a local content insertion channel from the system (channel deletion). The local content insertion channel list updater 350 generates an insertion or deletion signal to update the channel list to add or remove a channel and direct the system to the proper content within the file store 346 or the live channels from the live channel monitoring system 348. These operations may be performed through the console 56. The channel list updater 350 may also be used for updating a list of video-on-demand content as well as pay-per-view channels available within the content distribution system. Pay-per-view channels may be live channels provided directly from a service provider such as DIRECTV®. Pay-per-view channels may also be generated directly within the local content distribution system from programming received from DIRECTV® or another video source.

The video file importer 344 may also be used to receive pay-per-view programming. As mentioned above, pay-per-view programming has a fixed start time and end time. This may be locally established at the particular property from PPV files previously stored within the storage device 360 or from content streams provided directly from a service provider or external head end. The pay-per-view multicast IP video pump 370 may be used to provide pay-per-view channels and pay-per-view content to the user-receiving devices.

The local content functions 312 may also include a pay-per-view manager 372. The pay-per-view manager 372 may generate a purchase record of content purchased by a particular receiving device after a preview time has expired if applicable. Content owners often provide a free grace period such as five minutes before billing is incurred. A purchase record may be generated after the grace period. The purchase record may include purchase data such as the time, content title, channel and receiver identifier associated with the purchased content. The pay-per-view manager 372 reports the purchase to the property management system. The property management system 58 may report a checkout signal to the pay-per-view manager 372. The pay-per-view manager 372 may communicate a request to force a callback to the specific receiving device associated with the user account being checked out. The forced callback signal from the receiving device may be communicated directly to the external head end or indirectly to the external head end through the local head end. This allows the external head end to receive purchase data and store the purchase record for the local head end. Ultimately, a billing record is generated at the local head end. The billing record may be communicated electronically or through a paper copy to the owner of the local head end for payment.

The pay-per-view manager 372 may also provide conditional access signals to the user receiving devices so that the on-demand and pay-per-view channels can be withheld. The conditional access may include, but is not limited to, encryption keys/decryption keys.

Figure 4:
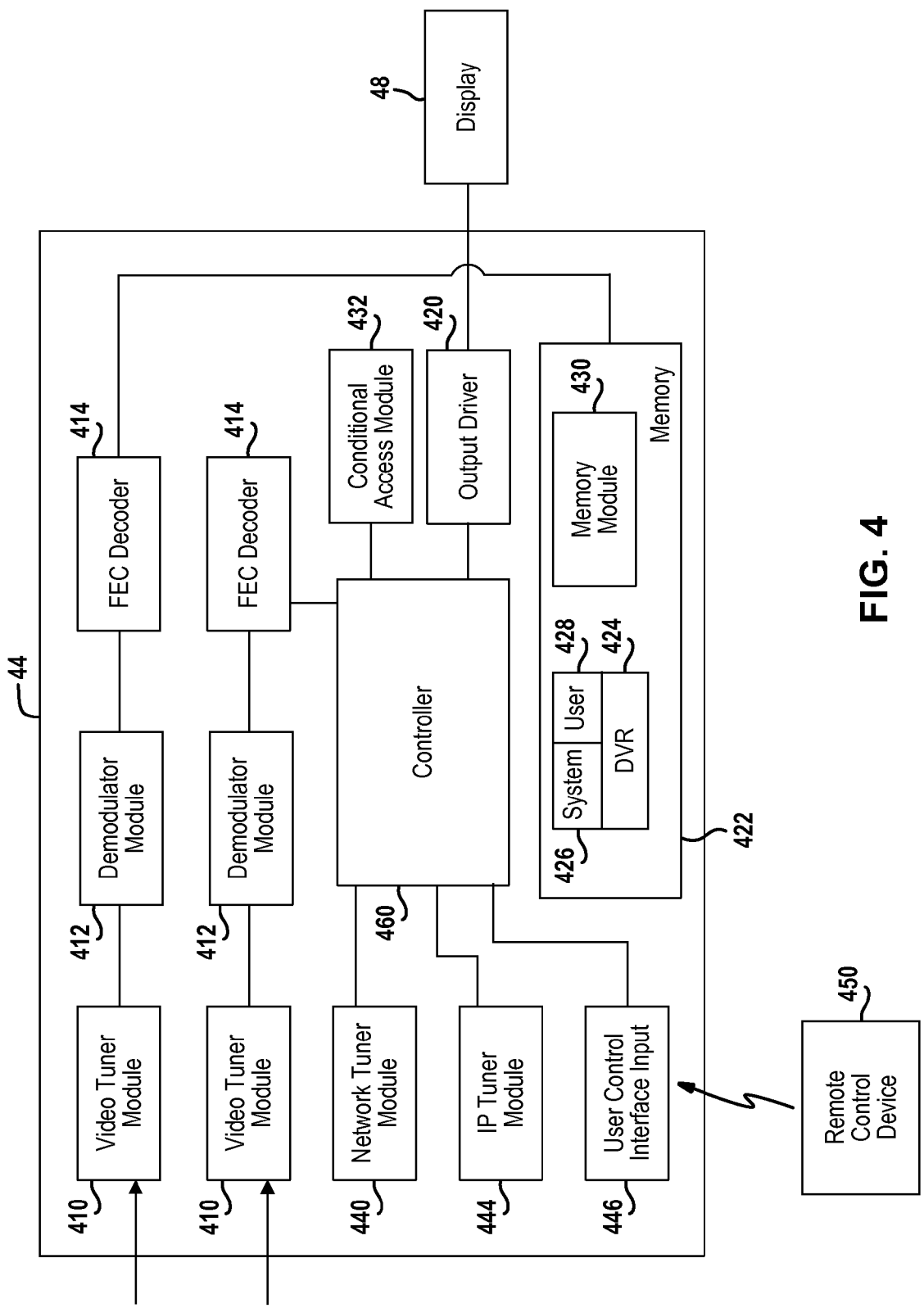
FIG. 4 is a block diagrammatic view of the user receiving device according to the present disclosure.

Referring now to FIG. 4, a user receiving device 44 is set forth in further detail. The user receiving device 44 may include one or more video tuner modules 410. The video tuner modules 410 may receive signals from the satellite antenna 40 through the single-wire multi-switch module 236. Each video tuner module 410 may be in communication with a demodulator module 412. The demodulator module 412 demodulates the tuned signal from the video tuner module and provides the output to a forward error correction decoder 414. The forward error correction decoder 414 may be provided to the display 48 through an output driver 420. Further, the output of one of the decoders 414 may be provided to a memory 422 which may include a DVR 424. As mentioned above, the DVR 424 may include a system partition 426 and a user partition 428. The content from the forward error correction decoder 414 may be stored in the user partition 428 for later playback.

A conditional access module (CAM) 432 may also be provided within the user receiving device. The CAM 432 may include decryption keys for decrypting the content received. The CAM 432 may receive signals from the local head end 42 for decrypting local PPV or on-demand content. Without a CAM 432 signals may not be used by the user receiving device 44.

The memory 422 may also include a memory module 430 that comprises various types of memory used for operating the user receiving device. For example, the memory module 432 may include volatile memory and non-volatile memory. Non-volatile memory may include an EEPROM. The memory module 432 may be used for storing various operational values and program guide data and the like.

The user receiving device 44 may also include a network tuner module 440. The network tuner module 440 may be used to tune to an RF signal for receiving program guide data. The program guide data and video-on-demand object may be received from an external source such as the satellite or through the local head end and the local content insertion functions 312 illustrated in FIG. 3. Guide data for local channels may be IP-based and received through the IP tuner module.

The user receiving device 44 may also include an IP tuner module 444. The IP tuner module 444 may be used to transmit and receive data through the local IP network associated with the content distribution system of the local head end.

The user receiving device 44 may also include a user control interface input 446. The user control interface input 446 may provide inputs from buttons or switches on a remote control device 450. For a setback box, the user control interface input 446 may be provided from the remote control device 450. For a set top box, the remote control device may communicate coded signals directly to the user control interface input using infrared or RF signals. The remote control device 450 may provide user control interface signals through a television for a user receiving device 44. The user control interface input 446 receives the coded signals from the remote control device and provides the coded signal to a controller 460. The controller 460 is a microprocessor-based system that controls the various components within the user receiving device 44. For example, the tuner module 410, the demodulator module 412, the decoder module 414, the conditional access module 430, the output driver 420, the memory 422 and the tuner modules 410 may all be associated or in communication with the controller 460. Based upon the various conditions, the controller 460 generates various outputs including displaying program guide data and content data as well as receiving and forming selections. Forming selections may include selecting a PPV channel or on-demand content and following the prompts for paying for or agreeing to pay for the content on checkout. The controller 460 also interfaces with the local head end 42 through the network tuner module 440 so that various functions may be controlled. Some functions have been described above and further functions will be described below.

It should be noted that the setback box or set top box embodied in the user receiving device 44 may not include all of the various components depending upon the configurations. Further, the number of other components may be increased as well. For example, the number of tuner modules 410, demodulator modules 412 and decoders 414 may be increased. Further, the requirement for an IP tuner module 444 or network tuner module 440 may not exist in some configurations. Various configurations for different types of systems using different types of communication protocols may require different components.

The video tuner module 410 may also be used to tune to program guide data that includes the video-on-demand objects that are broadcasted through the satellite 18 illustrated in FIG. 1. The program guide content may be content for upcoming available on-demand content. The metadata for on-demand content may be received from the program guide module 26 of FIG. 1 through the satellite and stored within the memory 422 of the set top box. As will be further described below, the display 48 of the set top box may not display on-demand content that is not fully available to be streamed locally. It is not until a manifest of material identifiers for currently replicated content is generated to allow the display to be formed. This function will be described in detail below.

Figure 5:
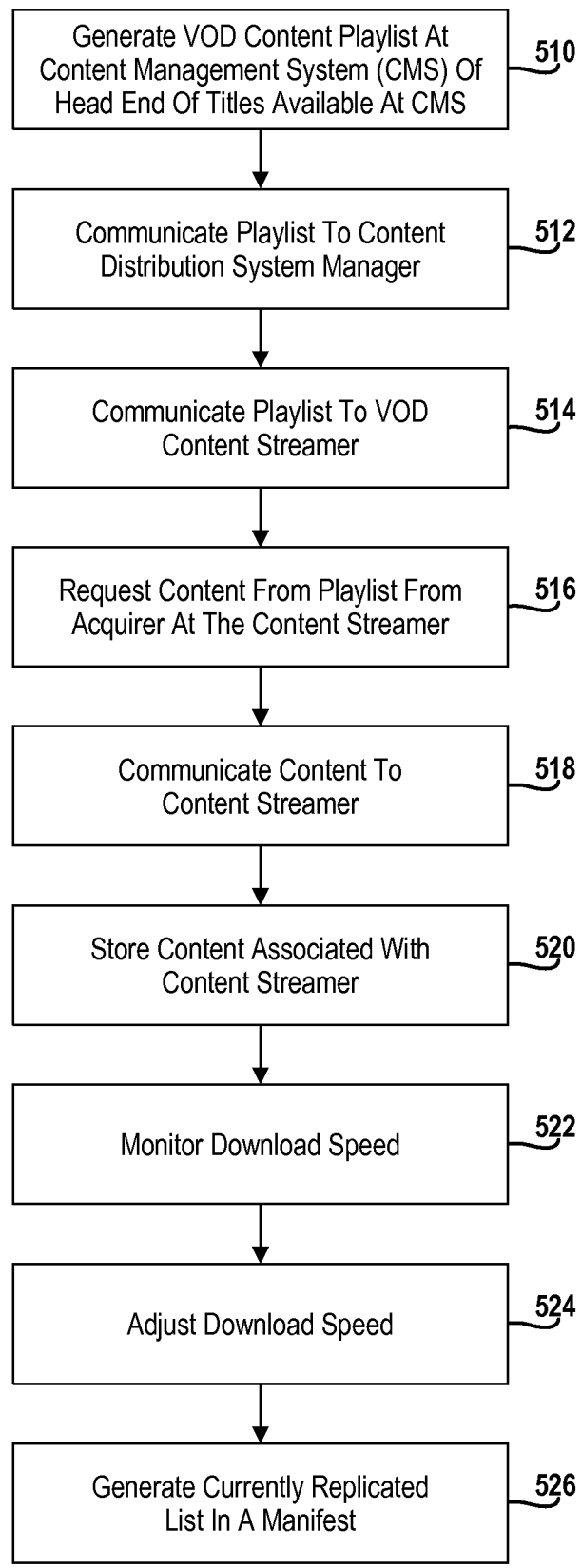
FIG. 5 is a flowchart of a method for communicating content to a content streamer within a head end.

Referring now to FIG. 5, a method for receiving content for a local head end is set forth. In step 510, a video-on-demand content playlist is generated at the content management system of the head end. The video-on-demand content playlist has a plurality of titles that are available at the content management system. The playlist may include a material identifier and a location or path or network address to use when requesting download of content.

In step 512, the playlist is communicated to the content distribution system. In particular, the playlist may be communicated to the content manager 76 of the content distribution system 72 as illustrated in FIG. 1A. In step 514, the playlist is communicated to the VOD content streamer of the local head end. For example, the playlist module 254 of FIG. 2 may request and/or receive the playlist. Ultimately, the playlist is stored within the memory 258 of FIG. 2 of the VOD content steamer 62. In step 518, the content is communicated to the content streamer at the request of the input stream module 252 of FIG. 2. The content may be requested to be steamed at a particular bit rate suitable for the connection speed of the particular building. In step 520, the content requested is stored within the memory 258 of the content streamer.

In step 522, the network speed is monitored by the network monitor 256. In step 524, the download speed may be adjusted based upon the monitoring of step 522. The speed may be adjusted upward or downward dependent upon the available bandwidth. In off-peak times, when with capacity of the network may be large, the speed of the downloads may be increased. During peak periods, the download may be adjusted at a slower rate to prevent interference from use by other devices within the building. In step 526, the manifest module 260 generates a manifest that has the currently replicated list. As mentioned briefly above, the currently replicated list comprises a plurality of material identifiers for content that has been stored within the memory 258 of FIG. 2 and is available to be steamed to the user receiving devices within the building. The currently replicated list may include a location identifier for obtaining the content. The location identifier may be a part or address used for obtaining the content. The address may be a network address such as an IP address.

Figure 6:
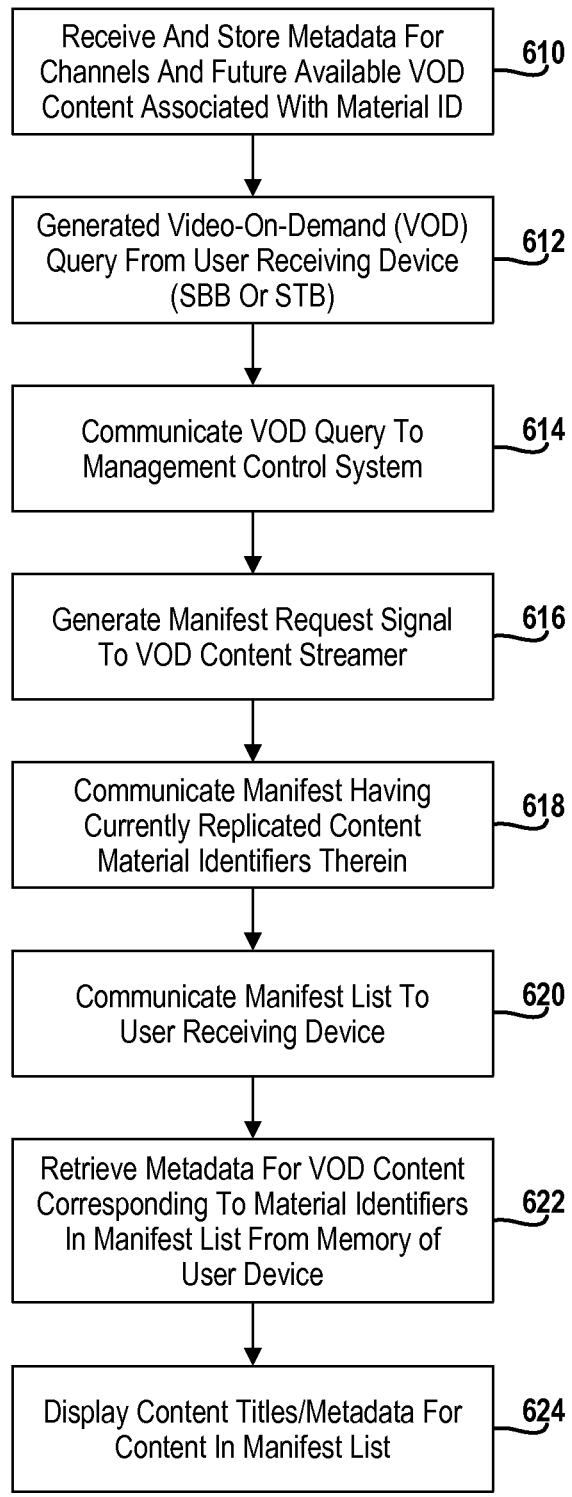
FIG. 6 is a flowchart of a method for operating a user receiving device to display video-on-demand content titles.

Referring now to FIG. 6, a method for operating the user receiving device is set forth. In step 610, metadata for channels and future available video-on-demand content is stored associated with a material identifier. The metadata received in step 610 may include, but is not limited to, the material identifier that identifies the program or movie title uniquely, a location identifier of the VOD content in the local network posters, descriptions, actors, actor descriptions, ratings, title and various other data. In step 612, a video-on-demand query may be generated from the user receiving device to obtain a manifest of content stored in the local memory for streaming in response thereto. As mentioned above, the user receiving device may be a set back box or a set top box. In step 614, the video-on-demand query is communicated to the management control system 50 illustrated in FIGS. 1 and 2.

In step 616, a manifest request signal is communicated to the video-on-demand content streamer 62. In step 618, a manifest having currently replicated content material identifiers and possibly location identifiers therein is communicated to the management control system 50. In step 620, the manifest is communicated to the requesting user receiving device.

It should be noted that the manifest list may be communicated directly to the user receiving device rather than from the management control system.

In step 622, metadata for the video-on-demand content corresponding to the material identifier in the manifest list may be obtained from the memory of the user receiving devices. As was described above, metadata may be stored within the user receiving device as described above in step 610. In step 624, the content titles and other metadata, such as posters, may be displayed on a screen display associated with a user receiving device for content files within the manifest list. As will be appreciated, as time goes on, titles will be added and removed from the system. Therefore, each request may cause a different manifest list to be generated.

Figure 7:
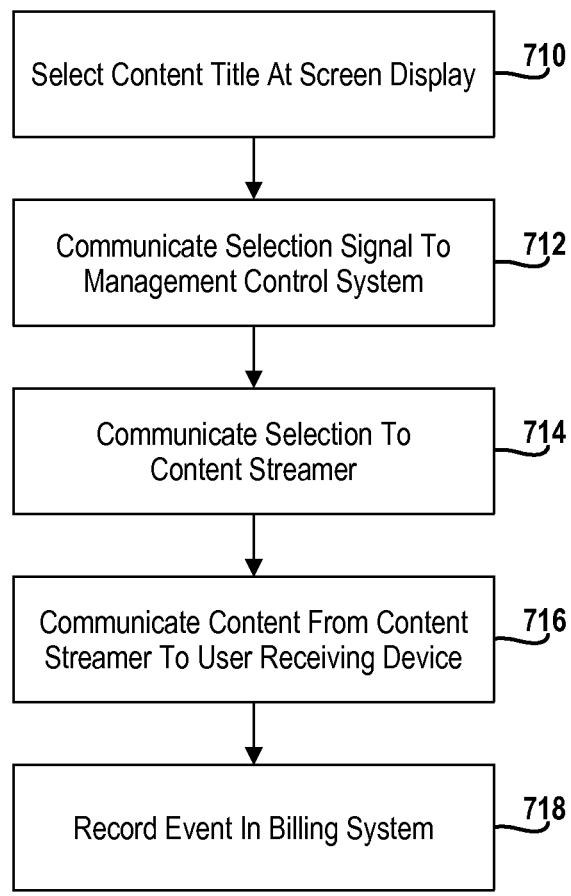
FIG. 7 is a flowchart of a method for selecting on-demand content from a user receiving device.

Referring now to FIG. 7, a method for displaying on-demand content at a screen display associated with a user receiving device. In step 710, a content title is selected at a screen display to form a selection signal corresponding to the selected content. The selection may cause the user receiving device to use the location to obtain or request the content. In step 712, a selection signal corresponding to the content title is communicated to the management control system. The selection signal may have the material identifier for the content therein. When an STB attempts to purchase a piece of content, it may verify with the PMS that the purchase request is approved. The hotel will then charge the guest for the movie, and DIRECTV will then charge the hotel for the movie. There may be an up or down differential in the amount paid by the hotel and the amount paid by the user. The hotel may add an incremental amount such as $1 or may bill lower that the hotel cost by way of promotion or reward. In step 714, the selection is communicated to the content streamer. In step 716, the content is communicated from the content streamer to the user receiving device. In step 718, a billing event or purchase record is recorded in the billing system to form a purchase record of the transaction. The purchase record may then be applied to the room number or directly to a user's account.

Figure 8:
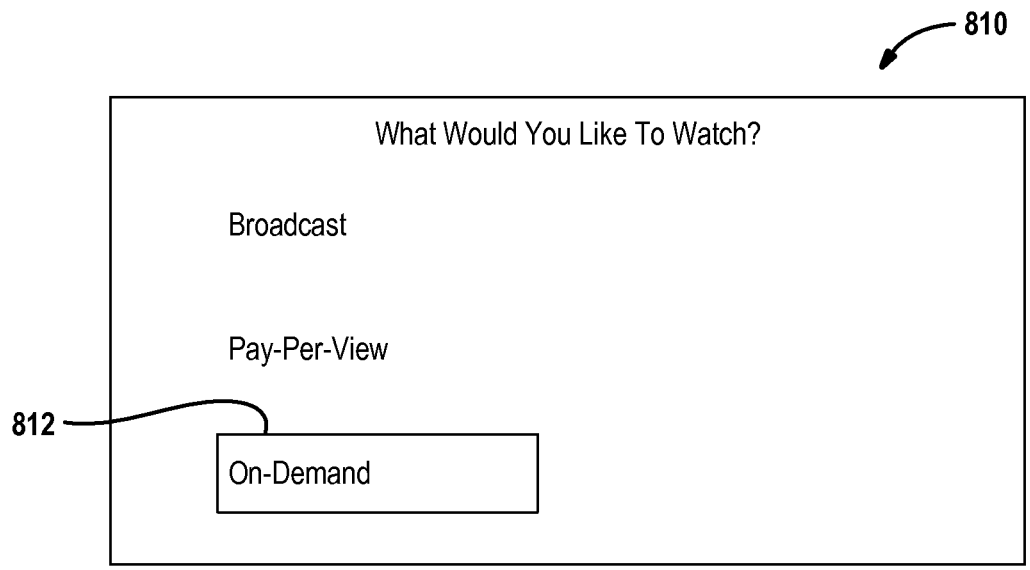
FIG. 8 is a screen display of a method for initiating a list of on-demand content.

Referring now to FIG. 8, a screen display 810 for various user receiving device choices is set forth. In this screen display, the user is queried whether they would like to watch broadcast content, pay-per-view or on-demand content. In this example, a selection box 812 is used to highlight or select the on-demand content using the user interface of the user receiving device. By generating a selection in the screen display 810 a request for a manifest is communicated to the content streamer.

Figure 9:
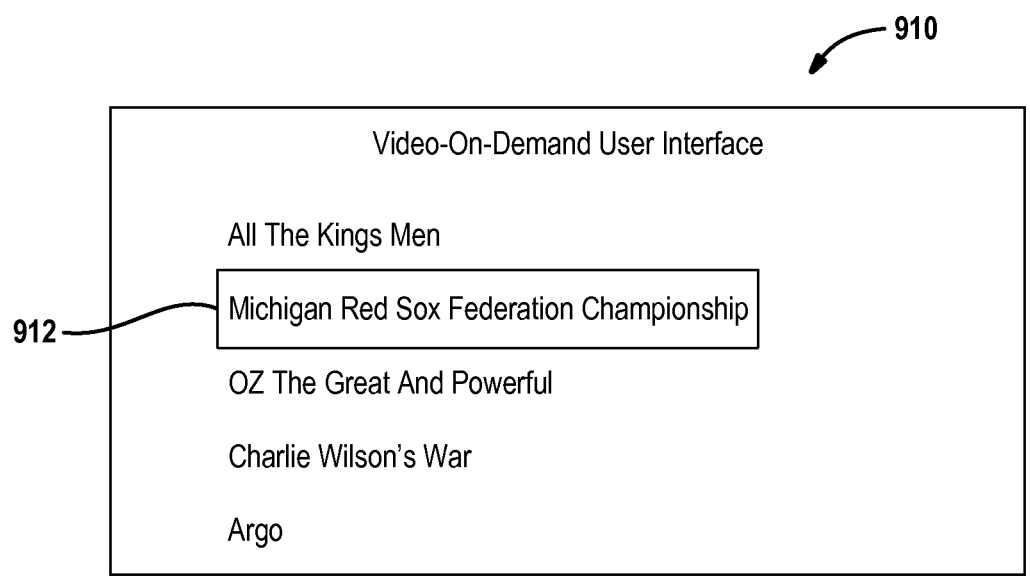
FIG. 9 is a screen display for initiating the playback of on-demand content.

Referring now to FIG. 9, a screen display for a video-on-demand user interface is illustrated as reference numeral 910. In this example, various titles such as *All The Kings Men, Michigan Red Sox Federation Championship, Oz The Great And Powerful, Charlie Wilsons War and Argo* are set forth in the video-on-demand interface. The data is obtained from the memory after the manifest is received at the user receiving device. A selection box 912 highlights *Michigan Red Sox Federation Championship*. The user may adjust the position of the user interface with a remote control device or other user interface. The selection signal with a location identifier or a material identifier or both may be communicated back to the local head end and content may be communicated according to FIG. 7.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
communicating metadata and material identifiers for on-demand content to a user receiving device, each on-demand content associated with one of the material identifiers;
storing the metadata and the material identifiers for the on-demand content in a memory of the user receiving device;
receiving content at a local head end, each content associated with one of the material identifiers;
communicating a request for on-demand content data signal from the user receiving device to the local head end;
communicating a manifest comprising material identifiers for content stored at the local head end to the user receiving device;
in response to receiving the manifest at the user receiving device, retrieving metadata for the material identifiers in the manifest from the memory of the user receiving device; and
displaying the metadata at the user receiving device.

2. The method as recited in claim 1 further comprising generating a selection of content from a user interface to form selected content from the user receiving device; and
communicating content corresponding to the selection to the user receiving device from the local head end.

3. The method as recited in claim 2 further comprising storing a purchase record corresponding to the selection at the local head end; and
associating the purchase record with the user receiving device within the local head end.

4. The method as recited in claim 1 wherein receiving content at a local head end comprises communicating a playlist to a content streamer and requesting content from the playlist at the content streamer.

5. The method as recited in claim 1 wherein communicating content comprises communicating on-demand content to one user receiving device immediately after being requested at the user receiving device.

6. The method as recited in claim 1 wherein communicating metadata comprises communicating metadata to a satellite television receiving device.

7. The method as recited in claim 1 wherein communicating metadata comprises communicating metadata to a set back box.

8. The method as recited in claim 1 wherein communicating the request for on-demand content data signal from the user receiving device to the local head end comprises communicating the request for on-demand content data signal from the user receiving device to a management control system of the local head end.

9. The method as recited in claim 8 further comprising generating a request for the manifest from the management control system to a content streamer and further comprising communicating the manifest from the content streamer to the management control system.

10. The method as recited in claim 9 further comprising communicating the manifest from the management control system to the user receiving device.

11. A system comprising:
a user receiving device; and
a local head end in communication with the user receiving device communicating metadata and material identifiers for on-demand content, each on-demand content associated with one of the material identifiers;
said user receiving device storing the metadata and the material identifiers for the on-demand content in a memory of the user receiving device;
said local head end receiving content, each content associated with one of the material identifiers;
said user receiving device communicating a request for on-demand content data signal to the local head end;
said local head end communicating a manifest comprising material identifiers for content stored at the head end;
said user receiving device, in response to receiving the manifest, retrieving metadata for the material identifiers in the manifest from the memory of the user receiving device; and
displaying metadata on a display associated with the user receiving device corresponding to the material identifiers.

12. The system as recited in claim 11 wherein said user receiving device generates a selection signal from a user interface to form selected content and wherein said local head end communicates content corresponding to the selected content to the user receiving device.

13. The system as recited in claim 12 wherein the local head end stores a purchase record corresponding to the selected content at the local head end and associates the purchase record with the user receiving device.

14. The system as recited in claim 11 wherein the local head end comprises a content streamer receiving a playlist from a remote head end and wherein the content streamer requests content from the playlist.

15. The system as recited in claim 11 wherein the user receiving device comprises a satellite television receiving device.

16. The system as recited in claim 11 wherein the user receiving device comprises a set back box.

17. The system as recited in claim 11 wherein the user receiving device communicates the request for on-demand content data signal to a management control system of the local head end.

18. The system as recited in claim 17 wherein the management control system communicates a request for the manifest to a content streamer and wherein the content stream communicates the manifest to the management control system.

19. The system as recited in claim 18 wherein the management control system communicates the manifest from the management control system to the user receiving device.

* * * * *